(12) United States Patent
Wilson

(10) Patent No.: US 6,692,060 B1
(45) Date of Patent: Feb. 17, 2004

(54) LIGHTED VISOR MIRROR ASSEMBLY AND METHOD

(75) Inventor: Douglas J. Wilson, Gratiot, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/246,352

(22) Filed: Sep. 18, 2002

(51) Int. Cl.[7] ................................................. B60J 3/00
(52) U.S. Cl. ..................................... 296/97.5; 296/97.1
(58) Field of Search .............................. 296/97.1, 97.5; 362/143, 144, 492

(56) References Cited

U.S. PATENT DOCUMENTS

| 3,211,903 A | 10/1965 | McElreath |
| 4,421,355 A | 12/1983 | Marcus |
| 4,486,819 A | * 12/1984 | Marcus et al. ............. 296/97.5 |
| 4,521,051 A | 6/1985 | Cody et al. |
| 4,791,537 A | 12/1988 | Fisher et al. |
| 4,926,295 A | * 5/1990 | Tamuraya ................... 362/492 |
| 4,961,608 A | 10/1990 | Nash |
| 5,022,699 A | 6/1991 | Yoshida |
| 5,067,764 A | * 11/1991 | Lanser et al. .............. 296/97.5 |
| 5,188,446 A | 2/1993 | Miller |
| 5,203,623 A | 4/1993 | Viertel et al. |
| 5,278,736 A | 1/1994 | Falcoff et al. |
| 5,438,491 A | 8/1995 | White |
| 5,441,325 A | 8/1995 | Toth et al. |
| 5,442,530 A | 8/1995 | Viertel et al. |
| 5,475,573 A | 12/1995 | White |
| 5,477,429 A | 12/1995 | Viertel et al. |
| 5,564,813 A | 10/1996 | Curtindale |
| 5,577,791 A | 11/1996 | Viertel et al. |
| RE35,622 E | 10/1997 | Wilson |
| 5,813,717 A | 9/1998 | Wilson |
| 5,887,933 A | 3/1999 | Peterson |
| 5,890,792 A | 4/1999 | Finn et al. |
| 5,906,424 A | 5/1999 | Peterson |
| H1834 H | 2/2000 | Wilson et al. |
| 6,231,105 B1 | 5/2001 | Viertel |

FOREIGN PATENT DOCUMENTS

JP        402133226 A     *  5/1990

* cited by examiner

Primary Examiner—Stephen T. Gordon
Assistant Examiner—Jason Morrow
(74) Attorney, Agent, or Firm—Bill C. Panagos

(57) ABSTRACT

A mirror light assembly and method are provided for illuminating a visor. The visor mirror light assembly includes a visor body. A mirror is slidably disposed relative to the visor body. A source of illumination is disposed adjacent the mirror. An electrical circuit provides electrical power from a power source to the source of illumination. Preferably, the mirror is movable between a first position wherein the electrical circuit is open and the source of illumination is not illuminated, and a second position wherein the electrical circuit is closed and the source of illumination is illuminated.

20 Claims, 6 Drawing Sheets

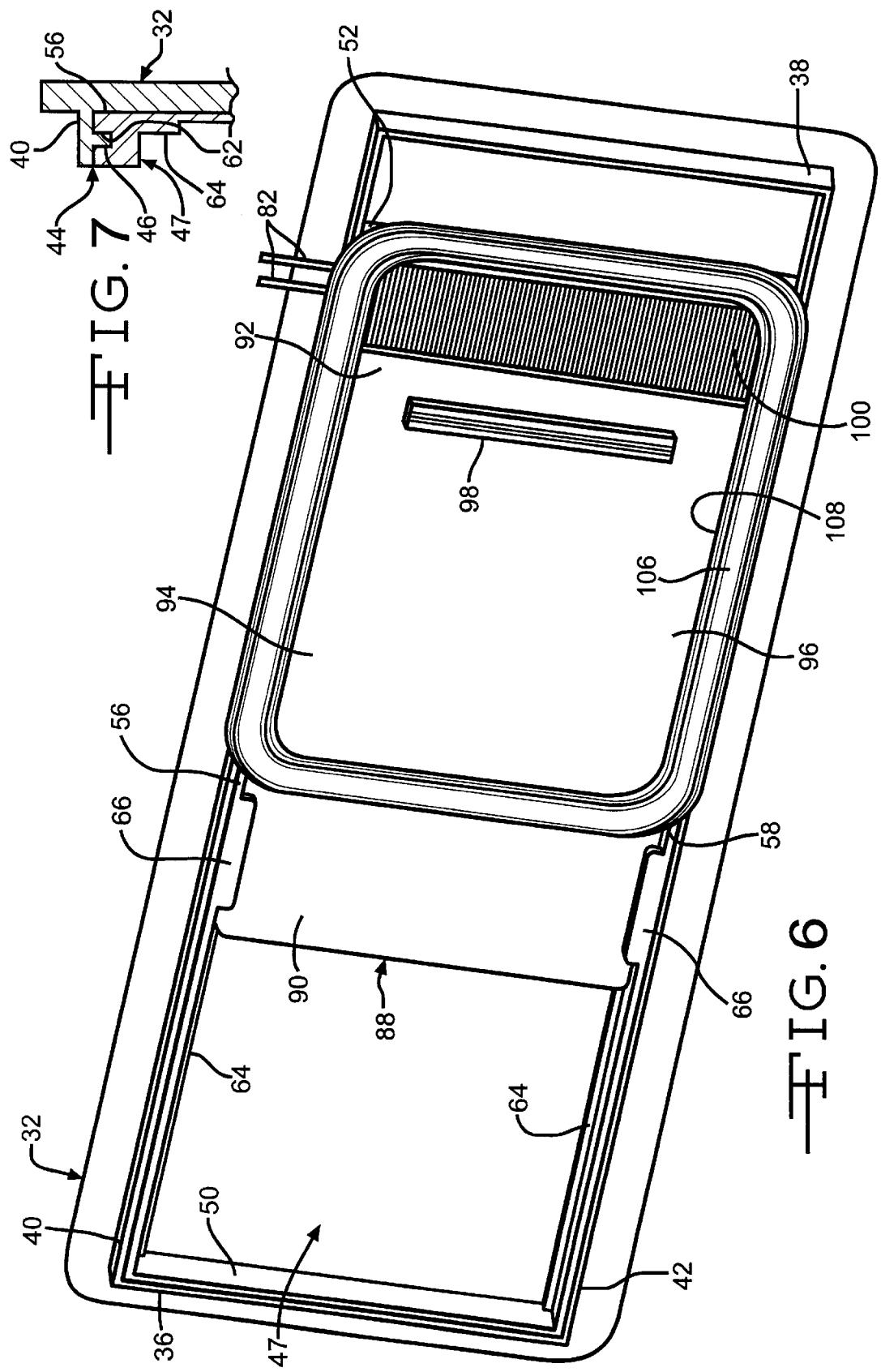

LIGHTED VISOR MIRROR ASSEMBLY AND METHOD

BACKGROUND OF THE INVENTION

The present invention relates to a visor for a vehicle and more particularly to an improved visor mirror light assembly and method.

When driving a vehicle, it is desirable to shield an occupant's eyes from glaring sunlight which enters the vehicle interior through the windshield or the side windows. As a result, vehicle interiors are usually equipped with sun visors.

Visors typically include a visor body and a pivot rod assembly. The pivot rod assembly typically includes an L-shaped pivot rod, a torque control, and a means for mounting the rod to the vehicle roof and/or headliner. The torque control rotationally mounts the visor body to the pivot rod, and allows the visor body to be moved between, and held at, various rotational positions with respect to the rod. Typically, a visor can be moved between a lowered position adjacent the windshield or side window and a raised position adjacent the roof and/or headliner.

Sun visors in vehicles frequently include mirror assemblies, some of which provide illumination to facilitate use of the mirror in low light conditions. Typically, vehicle manufacturers must choose between illuminated mirror assemblies wherein a source of illumination is permanently exposed on the outside of the sun visor, or hidden under a door. When the source of illumination is mounted under a door, the vehicle manufacturer is limited as to the location and size of the source of illumination relative to the mirror. Therefore, it would be advantageous to provide an improved visor mirror light assembly for a vehicle.

SUMMARY OF THE INVENTION

The present invention relates to an improved visor mirror light assembly and method of illuminating a visor. The visor mirror light assembly includes a visor body. A mirror is slidably disposed relative to the visor body. A source of illumination is disposed adjacent the mirror. An electrical circuit provides electrical power from a power source to the source of illumination. Preferably, the mirror is movable between a first position wherein the electrical circuit is open and the source of illumination is not illuminated, and a second position wherein the electrical circuit is closed and the source of illumination is illuminated.

According to the method of the invention, a visor mirror light assembly is provided. The visor mirror light assembly includes visor body, a slide drawer slidably disposed relative to the visor body, a mirror attached to the slide drawer, a source of illumination adjacent the mirror, an electrical circuit for providing electrical power from a power source to the source of illumination, and a door slidably disposed relative to the slide drawer. Initially, the door is moved to a closed position wherein the door covers the mirror and the source of illumination. The door is then moved to an open non-illuminated position wherein the mirror is exposed and the source of illumination is covered. The door and the slide drawer are then moved to an open illuminated position wherein the mirror and the source of illumination are exposed, and the source of illumination is illuminated. The door is then moved to a partially closed illuminated position wherein the door covers the mirror, and the source of illumination is exposed and illuminated.

Preferably, the electrical circuit includes a closed position wherein the source of illumination is illuminated, and an open position wherein the source of illumination is not illuminated. The electrical circuit is in the closed position when the door is in the open illuminated position and when the door is in the partially closed illuminated position. The electrical circuit is in the open position when the door is in the closed position and when the door is in the open non-illuminated position.

Various objects and advantages of this invention will become apparent to those skilled in the art from the following detailed description of the preferred embodiment, when read in light of the accompanying drawings.

BRIEF DESCRIPTION OF THE DRAWINGS

FIG. 6 is an enlarged perspective view of the mirror light assembly illustrated in FIG. 3 showing the door in the partially closed illuminated position.

FIG. 7 is a cross-sectional view of the mirror light assembly along line 7—7 in FIG. 2.

DETAILED DESCRIPTION OF THE INVENTION

Figure 1:
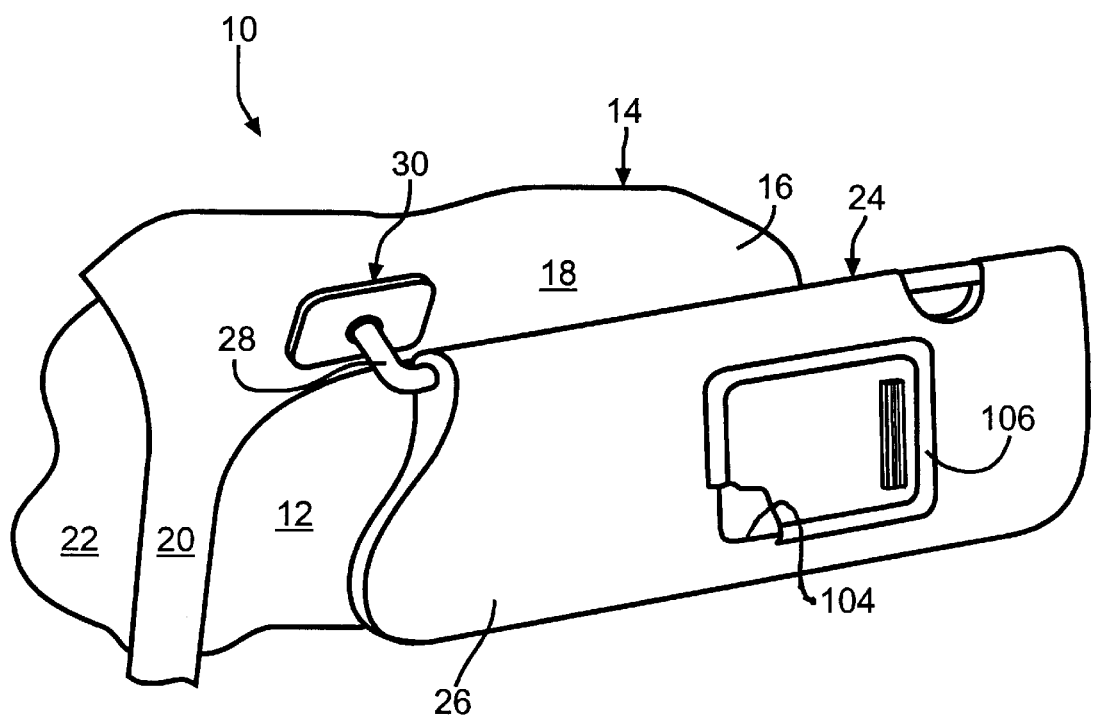
FIG. 1 is a fragmentary front elevational view of a lighted visor mirror assembly according to the invention, as installed in a vehicle.

Referring to FIG. 1, a vehicle 10 includes a windshield 12 and a mounting surface or roof 14. Preferably, the roof 14 is formed of sheet metal, although such is not required. The roof 14 provides structural support for the vehicle interior, and is typically covered by a headliner 16 having an upholstered surface 18 to provide an aesthetically pleasing appearance to the vehicle.

The vehicle 10 further includes a windshield pillar 20 separating the windshield 12 and a side window 22. An improved visor mirror light assembly 24 is shown on the driver's side of the vehicle 10. The visor mirror light assembly 24 includes a visor body 26, a visor arm 28, and visor bracket assembly 30 of conventional design.

Preferably, the visor body 26 is substantially hollow and includes a substrate formed from plastic, foam, or pressboard. The substrate can also be formed of any desired material. The substrate is preferably covered with cloth or vinyl. The visor arm 28 preferably mounts the visor body 26 to a mounting surface, such as the sheet metal of the vehicle roof 14. A torque control (not shown) rotationally mounts the visor body 26 to the visor arm 28, and is preferably mounted within the visor body 26. The torque control can be any desired type of torque control that allows the visor body 26 to be moved between, and held at, various rotational positions with respect to the visor arm 28. The torque control allows the visor body 26 to be moved between a lowered position substantially adjacent the vehicle windshield 12 or side window 22, and a raised position substantially adjacent the roof 14 and/or headliner 16. The visor arm 28 can also rotate with the visor body 26 from a position substantially adjacent the windshield 12, to a position substantially adjacent the side window 22.

Figure 2:
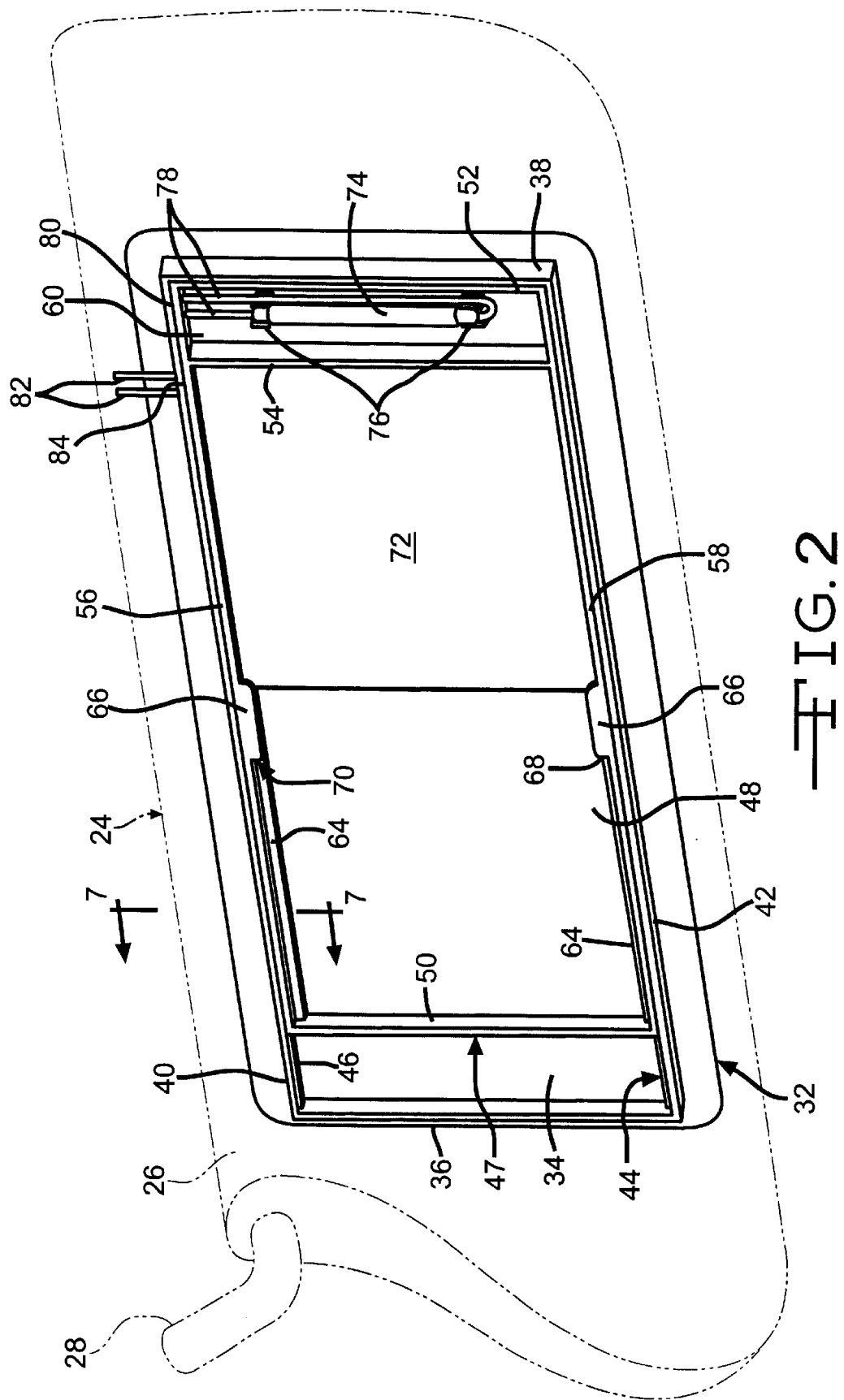
FIG. 2 is an enlarged perspective view of the mirror light assembly illustrated in FIG. 1 with the visor body removed, and showing the frame, slide drawer, mirror, electric bulb, and electrical circuit installed.
Figure 3:
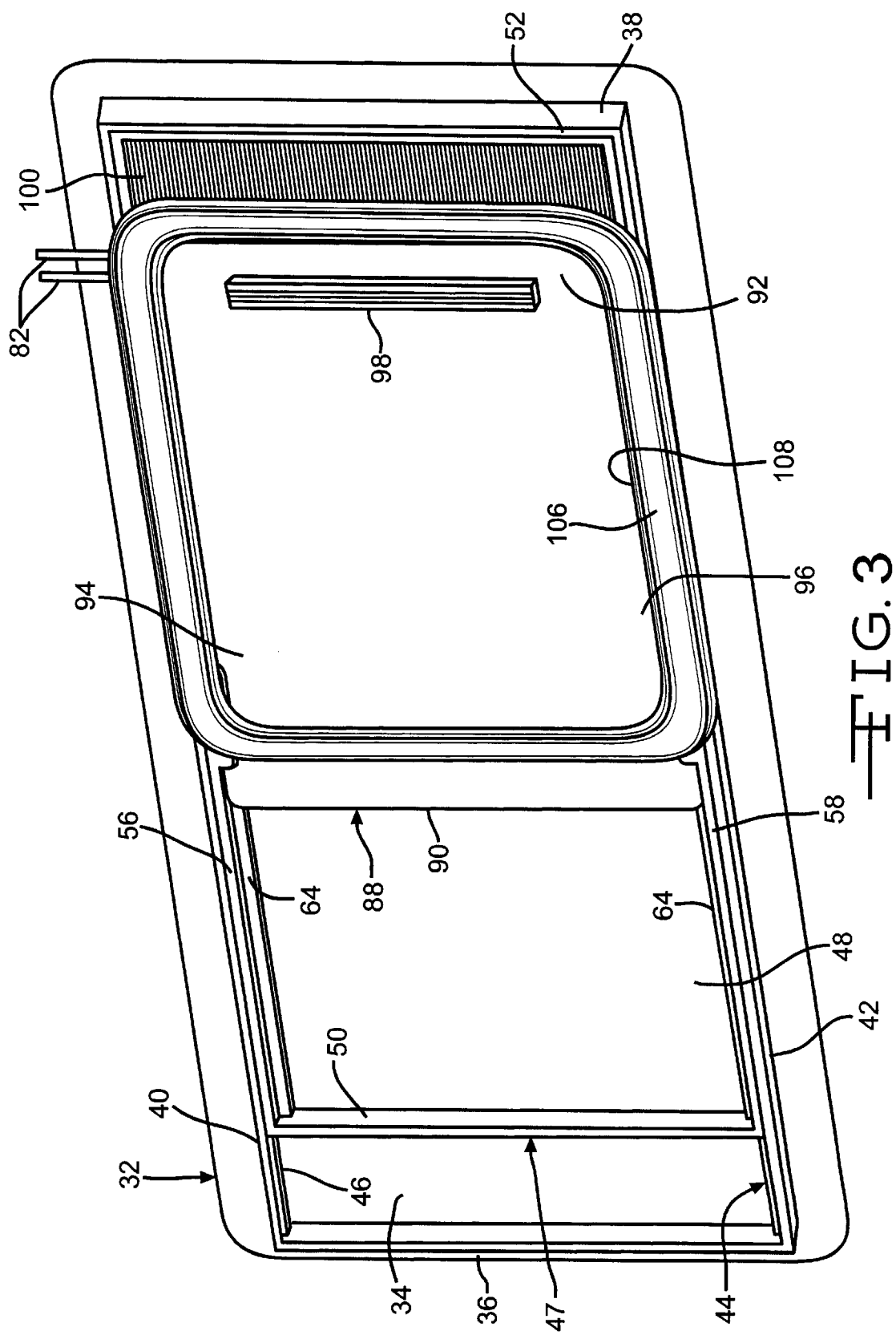
FIG. 3 is an enlarged perspective view of the mirror light assembly illustrated in FIG. 2 showing the door, the lens, and the bezel installed, and further showing the door in the closed position.

As best shown in FIGS. 2 and 3, the visor mirror light assembly 24 includes a frame 32 disposed within the visor body 26. The frame 32 can be attached within the visor body 26 by any desired method, such as with an adhesive with a snap-fit. Preferably, the frame 32 has a substantially rectangular shape, although such is not required. The frame 32 can also have any other desired shape. Preferably, the frame 32 is formed from a polymer such as polyethylene or polypropylene, although such is not required. The frame 32 can also be formed from any other desired material.

The frame 32 includes a frame base 34. A first end portion 36, a second end portion 38 opposite the first end portion 36, an upper side portion 40, and a lower side portion 42 (as viewed in FIG. 2) extend outwardly from the frame base 34. Preferably, a frame track 44 is formed on the upper and lower side portions 40 and 42. The frame track 44 includes a rail 46 formed substantially longitudinally on an inner surface of the upper and lower side portions 40 and 42, respectively.

A slide drawer 47 has a substantially rectangular shape, although such is not required. The slide drawer 47 can also have any other desired shape. Preferably, the slide drawer 47 is formed from a polymer such as polyethylene or polypropylene, although such is not required. The slide drawer 47 can also be formed from any other desired material.

The slide drawer 47 includes a drawer base 48. A first end portion 50, a second end portion 52 opposite the first end portion 50, an intermediate portion 54, an upper side portion 56, and a lower side portion 58 (as viewed in FIG. 2) extend outwardly from the frame base 34. Preferably, the intermediate portion 54 is disposed intermediate the fist and second end portions 50 and 52, and extends transversely between the upper and lower side portions 56 and 58. The intermediate portion 54 and the second end portion 52 define a light cavity 60. Preferably, grooves 62 for receiving the rails 46 are formed substantially longitudinally on an outer surface of the upper and lower side portions 56 and 58, respectively, of the slide drawer 47.

Substantially longitudinal ridges 64 are formed on the drawer base 48 adjacent the upper and lower side portions 56 and 58. Preferably, the ridges 64 extend from the first end portion 50 to a point intermediate the first end portion 50 and the intermediate portion 54, although such is not required. The ridges 64 can also extend the entire length of the slide drawer base 48. Inwardly extending tabs 66 are formed on the upper and lower side portions 56 and 58. A gap 68 is preferably defined between the ridges 64 and the tabs 66.

The slide drawer 47 is slidably disposed relative to the frame 32. Preferably, the rails 46 of the frame 32 are disposed within the grooves 62 of the slide drawer 47 such that the slide drawer 47 is slidably movable within the frame 32. The ridges 64 and the tabs 66 further define a door track 70.

A mirror 72 attached to the base 48 of the slide drawer 47 by any desired method, such as with an adhesive. A reflective surface can also be applied to the base 47 of the slide drawer 47 by any desired method, such as by spraying. A mirror pocket or cavity (not shown) can be formed in the slide drawer base 48 for receiving the mirror 72, although such a pocket is not required. Preferably, the mirror 72 is positioned adjacent the intermediate portion 54 of the slide drawer 47, and has a size such that the slide drawer base 48 cannot be seen when the mirror 72 is exposed, as described herein.

Figure 5:
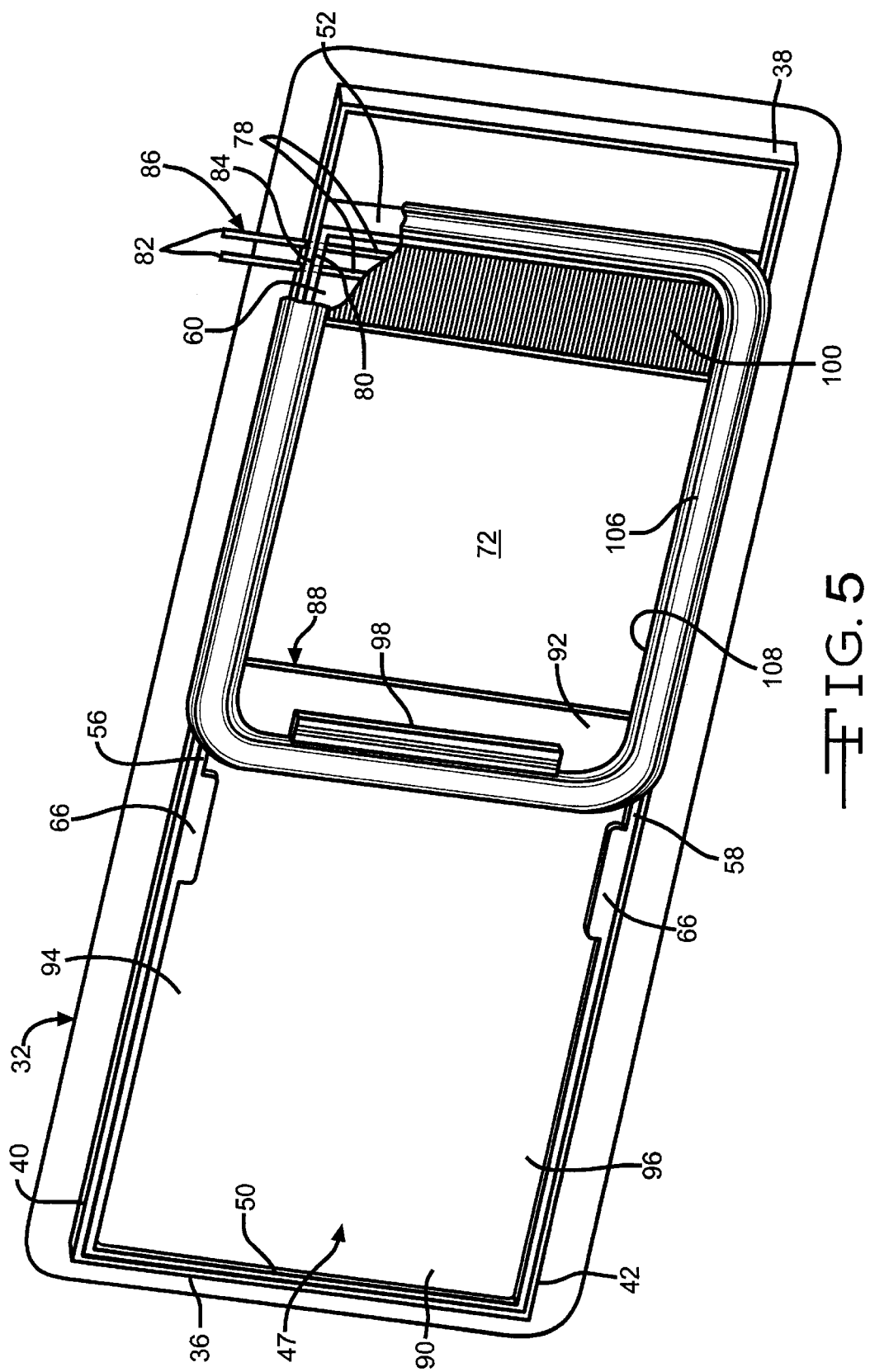
FIG. 5 is an enlarged fragmentary perspective view of the mirror light assembly illustrated in FIG. 3 showing the door in the open illuminated position, and showing the electrical circuit in the closed position.

A source of illumination is disposed within the light cavity 60. Preferably, the source of illumination is an electric bulb 74, although such is not required. The source of illumination can be any desired illumination source, such as a light-emitting diode (LED) or a liquid crystal display (LCD). The electric bulb 74 can be mounted to the slide drawer 47 by any desired method, such as clips 76, although such is not required. The electric bulb 74 can also be mounted within the light cavity 60 by any other desired method. Preferably, the electric bulb 74 is centrally disposed within the light cavity 60. As best shown in FIGS. 2 and 5, first power cables 78 are attached to the electric bulb 74 and extend through the upper side portion 56 of the slide drawer 47. Preferably, the first power cables 78 terminate at a first power connection 80 on an outer surface of the upper side portion 56.

Although the visor mirror light assembly 24 has been described as including a mirror 72 attached to a slide drawer 47, it will be appreciated that a slide drawer 47 is not required. For example, the visor mirror light assembly 24 can include a mirror assembly (not shown) slidably disposed relative to the frame 32, and wherein the mirror assembly and the electric bulb 74 are fixed relative to one another.

Figure 4:
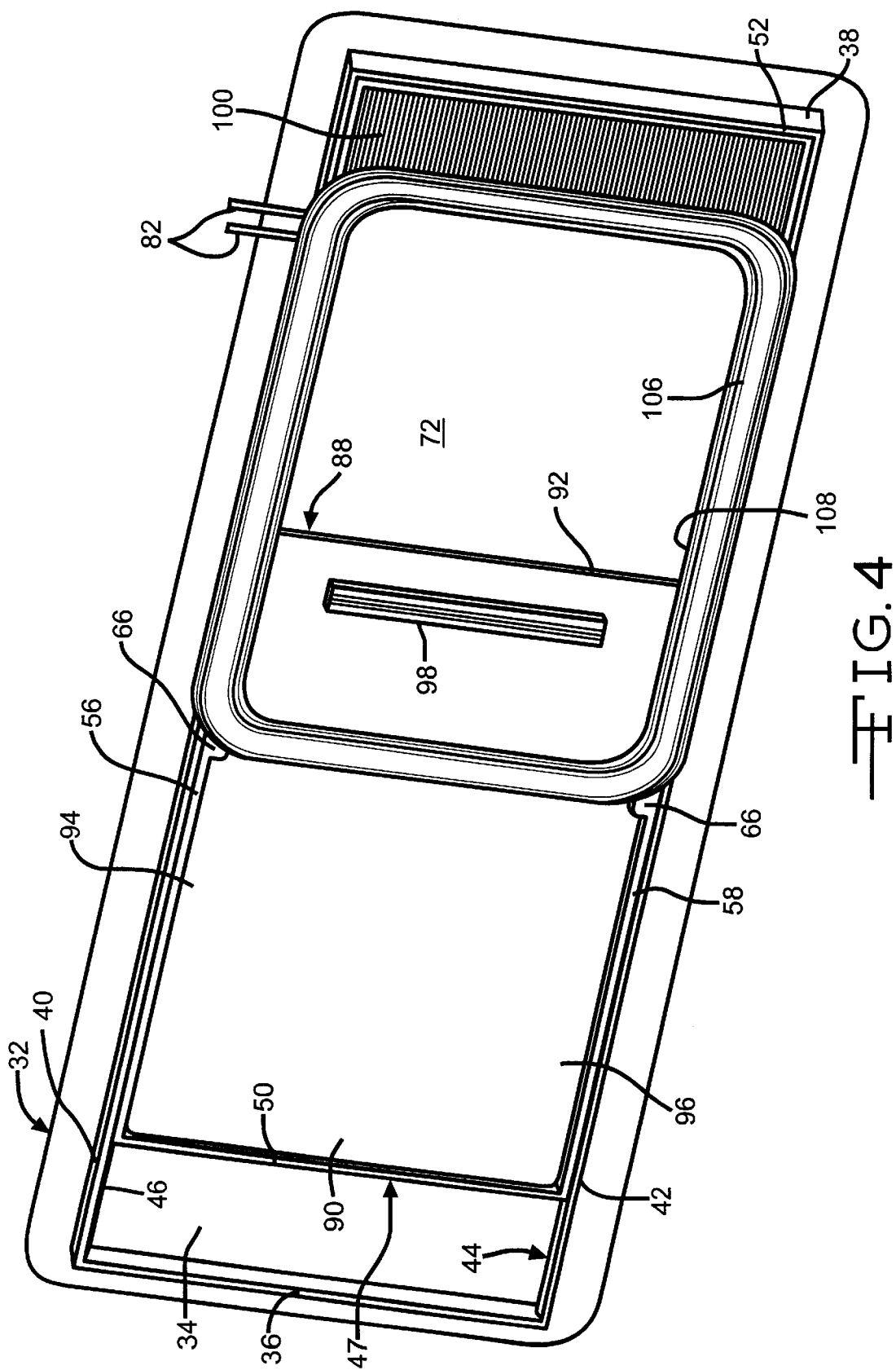
FIG. 4 is an enlarged perspective view of the mirror light assembly illustrated in FIG. 3 showing the door in the open non-illuminated position.

As best shown in FIGS. 2 and 5, second power cables 82 are attached to a vehicle power source (not shown) and the upper side portion 40 of the frame 32. Preferably, the second power cables 82 are spaced apart from the first power cables 78 when the visor mirror light assembly 24 is in a closed or non-illuminated position, as explained herein and as shown in FIGS. 2 through 4, inclusive. The second power cables 82 preferably terminate at a second power connection 84 on an inner surface of the upper side portion 40. The first and second power cables 78 and 82 define an electrical circuit 86 for providing electrical power from the source of vehicle power to the electric bulb 74.

Preferably, the electrical circuit 86 includes a closed position wherein the source of illumination is illuminated, as shown in FIG. 5, and an open position wherein the source of illumination is not illuminated, as shown in FIG. 2.

Referring to FIGS. 3 through 6, inclusive, a door 88 is provided. The door 88 has a substantially rectangular shape, although such is not required. The door 88 can also have any other desired shape. Preferably, the door 88 is formed from a polymer such as polyethylene or polypropylene, although such is not required. The door 88 can also be formed from any other desired material. The door 88 includes a first end portion 90, a second end portion 92 opposite the first end portion 90, an upper side portion 94, a lower side portion 96, and a handle or grip 98. Preferably the grip 98 is disposed on a surface of the door 88.

The door 88 is slidably disposed relative to the slide drawer 47. Preferably, the upper and lower side portions 94 and 96 of the door 88 are disposed in the gaps 68 of the slide drawer 47. An inner surface of the door is preferably in sliding engagement with the ridges 64 of the slide drawer. 47. A lens 100 is preferably provided for diffusing the light from the electric bulb 74, and can be attached to the slide drawer 47 by any desired means, such as with an adhesive.

Preferably, the visor mirror light assembly 24 is mounted within a substantially hollow cavity of the visor body 26, shown in phantom line in FIG. 2. Preferably, the visor body 26 includes an opening 104. A bezel 106 is preferably disposed about the opening 104 of the visor body 26. Preferably, the bezel 106 is attached to the frame 32, such as by snap-fit. However, the bezel 106 can also be attached to the visor body 26 and/or the frame 32 by any other desired method. The bezel 106 preferably includes a bezel opening 108 corresponding to the opening 104 of the visor body 26.

Although the invention has been described in the context of the visor mirror light assembly 24 including a frame 32, and being mounted within a visor body 26, such is not required. For example, the visor body 26 can also have a substantially clamshell configuration. Preferably, the clamshell formed from thermoplastic such as polypropylene. In such a clamshell configuration, a portion of the visor mirror light assembly, such as the frame tracks 44, can be integrally formed in an alternate embodiment of the visor body. Additionally, the bezel 106 can be integrally formed in the visor body. An example of a visor body having such a clamshell configuration is disclosed in U.S. Pat. No. 5,887, 933 to Peterson, and is incorporated herein by reference.

In operation, the visor mirror light assembly 24 is selectively movable between four positions. In a first or closed position, as shown in FIG. 3, the door 88 is moved to cover the mirror 72 and the electric bulb 74. In a second or open non-illuminated position, as shown in FIG. 4, the door 88 is moved to expose the mirror 72, and the electric bulb 74 is covered. In a third or open illuminated position, as shown in FIG. 5, the door 88 and the slide drawer 47 are moved to expose the mirror 72 and expose the electric bulb 74, and the electric bulb 74 is illuminated. In a fourth or partially closed illuminated position, as shown in FIG. 6, the door 88 is moved to cover the mirror 72 and expose the electric bulb 74, and the electric bulb 74 is illuminated.

In addition, the electrical circuit 86 includes a closed position wherein the electric bulb 74 is illuminated, and an open position wherein the electric bulb 74 is not illuminated. The electrical circuit 86 is in the closed position when said door 88 is in the open illuminated position and when the door 88 is in the partially closed illuminated position, as shown in FIGS. 5 and 6. The electrical circuit 86 is in the open position when the door 88 is in the closed position and when the door 88 is in the open non-illuminated position, as shown in FIGS. 3 and 4.

The method of illumination of the visor mirror light assembly 24 will now be discussed with reference to FIGS. 3 through 6, inclusive. The visor mirror light assembly is first assembled as described herein, and as best shown in FIGS. 3 through 6, inclusive. The closed position is achieved by applying a force to the grip 98 of the door 88 such that the door 88 is caused to slide rightward, as viewed in FIG. 3. The door 88 is slid to the closed position wherein the second end portion 92 of the door 88 contacts the intermediate portion 54 of the slide drawer 47, and the door 88 covers the mirror 72 and the lens 100. In the closed position, the electrical circuit 86 is in the open position wherein the electric bulb 74 is not connected to the source of vehicle power, and the electric bulb 74 is not illuminated. From the closed position, the visor mirror light assembly 24 can then be moved to the open non-illuminated position, as shown in FIG. 4.

The open non-illuminated position is achieved by applying a force to the grip 98 such that the door 88 is caused to slide leftward, as viewed in FIG. 4. The door 88 is slid to the open non-illuminated position wherein the first end portion 90 of the door 88 contacts the first end portion 50 of the slide drawer 47, the mirror 72 thereby being exposed and the lens 100 remaining covered. In the open non-illuminated position, the electrical circuit 86 remains in the open position wherein the electric bulb 74 is not connected to the source of vehicle power, and the electric bulb 74 is not illuminated. From the open non-illuminated position, the visor mirror light assembly 24 can then be moved to the open illuminated position, as shown in FIG. 5.

The open illuminated position is achieved by applying a force to the grip 98, such that the slide drawer 47 is caused to slide leftward, as viewed in FIG. 5. The door 88 is slid to the open non-illuminated position wherein the first end portion 50f the slide drawer 47 contacts the first end portion 36 the frame 32, the mirror 72 remaining exposed, and the lens 100 thereby being exposed. In the open illuminated position, the electrical circuit 86 is in the closed position wherein the electric bulb 74 is connected to the source of vehicle power and illuminated. From the open illuminated position, the visor mirror light assembly 24 can then be moved to the partially closed illuminated position, as shown in FIG. 6.

The partially closed illuminated position is achieved by applying a force to the grip 98, such that the door 88 is caused to slide rightward, as viewed in FIG. 6. The door 88 is slid to the partially closed illuminated position wherein the second end portion 92 of the door 88 contacts the intermediate portion 54 of the slide drawer 47, the mirror 72 being covered, and the lens 100 remaining exposed. In the partially closed illuminated position, the electrical circuit 86 is in the closed position wherein the electric bulb 74 is connected to the source of vehicle power and illuminated. From the partially closed illuminated position, the visor mirror light assembly 24 can then be moved to the closed position, as shown in FIG. 3, or moved to the open illuminated position, as shown in FIG. 5.

It will be appreciated that the electrical circuit 86 can include a switch (not shown) which is operable to selectively move the electrical circuit 86 between the open and the closed positions. With such a switch, an operator can vary the intensity of light emitted from the source of illumination. For example, with the electrical circuit 86 closed, the intensity of light emitted from the source of illumination can be varied by varying the amount which the electric bulb 74, or other source of illumination, is uncovered within the opening 104 of the visor body 26. By varying the amount which the electric bulb 74 is uncovered within the opening 104 of the visor body 26, the intensity of light emitted from the source of illumination can also be selectively varied. Such a switch further allows the operator to selectively move the electrical circuit 86 between the closed position and the open position when desired, thereby selectively "turning on" and "turning off" the source of illumination.

The principle and mode of operation of this invention have been described in its preferred embodiment. However, it should be noted that this invention may be practiced otherwise than as specifically illustrated and described without departing from its scope. For example, modifications to the invention can include, but are not limited to, modifying the shape of the frame, the slide drawer, the mirror, the door, and the visor body.

What is claimed is:

1. A visor mirror light assembly comprising:
   a visor body;
   a mirror slidably disposed relative to said visor body;
   a source of illumination adjacent said mirror; and
   a door slidably disposed relative to said mirror for selectively covering said mirror.

2. The visor mirror light assembly according to claim 1, wherein said mirror and said source of illumination are fixed relative to one another.

3. The visor mirror light assembly according to claim 1, wherein said mirror is attached to a slide drawer, said slide drawer being slidably disposed relative to said visor body.

4. The visor mirror light assembly according to claim 1 further including an electrical circuit for providing electrical power from a power source to said source of illumination, said mirror being movable between a first position wherein said electrical circuit is open and said source of illumination is not illuminated, and a second position wherein said electrical circuit is closed and said source of illumination is illuminated.

5. The visor mirror light assembly according to claim 1, wherein said visor body is substantially hollow and includes a mirror slide track formed on an inner surface thereof, said mirror being slidably disposed in said mirror slide track of said visor body.

6. The visor mirror light assembly according to claim 1, wherein a slide drawer includes a door track formed on an inner surface thereof, said door being slidably disposed in said door track of said slide drawer.

7. The visor mirror light assembly according to claim 1, wherein said door is movable between a closed position wherein said door is moved to cover said mirror and said source of illumination, an open non-illuminated position, wherein said door is moved to expose said mirror and cover said source of illumination, an open illuminated position, wherein said door and said slide drawer are moved to expose said mirror and expose said source of illumination, said source of illumination being illuminated, and a partially closed illuminated position, wherein said door is moved to cover said mirror and expose said source of illumination, said source of illumination being illuminated.

8. The visor mirror light assembly according to claim 4, wherein said electrical circuit includes a closed position wherein said source of illumination is illuminated, and an open position wherein said source of illumination is not illuminated, said electrical circuit being in said closed position when said door is in said open illuminated position and when said door is in said partially closed illuminated position, said electrical circuit being in said open position when said door is in said closed position and when said door is in said open non-illuminated position.

9. The visor mirror light assembly according to claim 1, further including a frame, said mirror being slidably disposed relative to said frame.

10. The visor mirror light assembly according to claim 1, further including a lens for diffusing the light from said source of illumination.

11. A visor mirror light assembly comprising:
    a visor body;
    a slide drawer slidably disposed relative to said visor body;
    a mirror attached to said slide drawer;
    a source of illumination adjacent said mirror;
    an electrical circuit for providing electrical power from a power source to said source of illumination; and
    a door slidably disposed relative to said slide drawer.

12. The visor mirror light assembly according to claim 11, wherein said mirror and said source of illumination are fixed relative to one another.

13. The visor mirror light assembly according to claim 11, wherein said visor body is substantially hollow and includes a slide drawer track formed on an inner surface thereof, said slide drawer being slidably disposed in said slide drawer track of said visor body.

14. The visor mirror light assembly according to claim 11, wherein said slide drawer includes a door track formed on an inner surface thereof, said door being slidably disposed in said door track of said slide drawer.

15. The visor mirror light assembly according to claim 11, further including a lens disposed within said slide drawer, said lens for diffusing the light from said source of illumination.

16. The visor mirror light assembly according to claim 1, wherein said door is movable between a closed position wherein said door is moved to cover said mirror and said source of illumination, an open non-illuminated position, wherein said door is moved to expose said mirror and cover said source of illumination, an open illuminated position, wherein said door and said slide drawer are moved to expose said mirror and expose said source of illumination, said source of illumination being illuminated, and a partially closed illuminated position, wherein said door is moved to cover said mirror and expose said source of illumination, source of illumination being illuminated.

17. The visor mirror light assembly according to claim 7, wherein said electrical circuit includes a closed position wherein said source of illumination is illuminated, and an open position wherein said source of illumination is not illuminated, said electrical circuit being in said closed position when said door is in said open illuminated position and when said door is in said partially closed illuminated position, said electrical circuit being in said open position when said door is in said closed position and when said door is in said open non-illuminated position.

18. The visor mirror light assembly according to claim 13, further including a frame, said slide drawer track being formed on an inner surface of said frame.

19. A method of illuminating a visor assembly, the method comprising the steps of:
    a. providing a visor mirror light assembly comprising visor body, a slide drawer slidably disposed relative to the visor body, a mirror attached to the slide drawer, a source of illumination adjacent the mirror, an electrical circuit for providing electrical power from a power source to the source of illumination, and a door slidably disposed relative to the slide drawer;
    c. moving the door to a closed position wherein the door covers the mirror and the source of illumination;
    d. moving the door to an open non-illuminated position wherein the mirror is exposed and the source of illumination is covered;
    e. moving the door and the slide drawer to an open illuminated position wherein the mirror and the source of illumination are exposed, the source of illumination being illuminated; and
    f. moving the door to a partially closed illuminated position wherein the door covers the mirror and the source of illumination is exposed, the source of illumination being illuminated.

20. The method according to claim 19, wherein the electrical circuit includes a closed position wherein the source of illumination is illuminated, and an open position wherein the source of illumination is not illuminated, the electrical circuit being in the closed position when the door is in the open illuminated position and when the door is in the partially closed illuminated position, the electrical circuit being in the open position when the door is in the closed position and when the door is in the open non-illuminated position.

* * * * *

UNITED STATES PATENT AND TRADEMARK OFFICE
CERTIFICATE OF CORRECTION

PATENT NO. : 6,692,060 B1 Page 1 of 1
DATED : February 17, 2004
INVENTOR(S) : Douglas J. Wilson It is certified that error appears in the above-identified patent and that said Letters Patent is hereby corrected as shown below:

Column 8,
Line 9, delete "claim 1" and insert -- claim 11 --;
Line 21, delete "claim 7" and insert -- claim 21 --;
Line 22, insert the following before the word "wherein": -- wherein said door is movable between a closed position wherein said door is moved to cover said mirror and said source of illumination, an open non-illuminated position, wherein said door is moved to expose said mirror and cover said source of illumination, an open illumination position, wherein said door and said slide drawer are moved to expose said mirror and expose said source of illumination, said source of illumination being illuminated, and a partially closed illuminated position, wherein said door is moved to cover said mirror and expose said source of illumination, said source of illumination being illuminated, --

Signed and Sealed this

Thirteenth Day of April, 2004

JON W. DUDAS
*Acting Director of the United States Patent and Trademark Office*